US011987018B2

(12) United States Patent
Suzuki et al.

(10) Patent No.: US 11,987,018 B2
(45) Date of Patent: May 21, 2024

(54) DUST SOLIDIFICATION APPARATUS

(71) Applicant: SINTOKOGIO, LTD., Nagoya (JP)

(72) Inventors: Takashi Suzuki, Nagoya (JP); Shintaro Nishikawa, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 267 days.

(21) Appl. No.: 17/366,515

(22) Filed: Jul. 2, 2021

(65) Prior Publication Data

US 2022/0024168 A1 Jan. 27, 2022

(30) Foreign Application Priority Data

Jul. 21, 2020 (JP) ................................ 2020-124095

(51) Int. Cl.

| | |
|---|---|
| ***B30B 9/30*** | (2006.01) |
| ***B30B 11/06*** | (2006.01) |
| ***B30B 15/06*** | (2006.01) |
| ***B30B 15/30*** | (2006.01) |

(52) U.S. Cl.

CPC ............ *B30B 11/06* (2013.01); *B30B 15/065* (2013.01); *B30B 15/302* (2013.01)

(58) Field of Classification Search

CPC ......... B30B 9/30; B30B 9/301; B30B 9/3032; B30B 9/3042; B30B 11/08; B30B 15/0023; B30B 15/08; B30B 15/32

See application file for complete search history.

(56) References Cited

U.S. PATENT DOCUMENTS 5,611,268 A * 3/1997 Hamilton .............. B30B 11/246 100/147
2009/0126533 A1 5/2009 Yamaguchi et al.

FOREIGN PATENT DOCUMENTS

| | | | |
|---|---|---|---|
| JP | H04-123898 A | | 4/1992 |
| JP | 2002126967 A | * | 5/2002 |
| JP | 2010-069536 A | | 4/2010 |
| JP | 2011-156560 A | | 8/2011 |

* cited by examiner

*Primary Examiner* — Thu Khanh T. Nguyen
(74) *Attorney, Agent, or Firm* — Oliff PLC

(57) ABSTRACT

A dust solidification apparatus that homogenizes dust components having a simple structure and capable of performing dust solidification in a stable manner includes: a storage tank that stores dust; a forming member within the storage tank, the forming member having a forming hole; and a pressurizing rod configured to freely advance and withdraw with respect to the inside of the forming hole, wherein the rod is made to advance into the forming hole to solidify dust filled therein, thereby obtaining a solidified substance, the forming hole has entry and discharge sections for the pressurizing rod and is in communication with the storage tank, and a stirring passage is provided in the outside of the discharge section to guide dust pushed out from the discharge section by the entry of the pressurizing rod into the entry section in a direction different from the discharge direction and to stir the dust.

6 Claims, 13 Drawing Sheets

C - C

DUST SOLIDIFICATION APPARATUS

TECHNICAL FIELD

The present invention relates to a dust solidification apparatus.

BACKGROUND

Dust containing fumes generated during laser processing, plasma processing, and welding, etc. of metallic materials and the like can cause serious health hazards if inhaled by workers. Therefore, in order to keep the working environment clean, a dust collector is operated to remove the dust from the working environment. The dust collected in the dust collector is in a state with a small bulk density, and since it is difficult to handle dust in this state, the dust is compressed, solidified, and processed into a body that is easy to handle.

Regarding the solidification of dust, Patent Document 1 discloses an apparatus for solidifying waste. In this document, waste stored in a hopper is supplied into trough-type compression chambers provided below the hopper and solidified by being compressed from the upper and side portions of the compression chambers. Thereafter, Patent Document 1 describes that the compression chambers move laterally and the solidified substance is pushed out and discharged by means of a pushing means.

Patent Document 2 discloses a processing apparatus that supplies captured fine powder to a forming chamber by means of a screw conveyor, and compresses and solidifies the fine powder by lowering a compression slider when the fine powder reaches a prescribed amount. Compression is performed several times by additionally supplying fine powder, and when the solidified and formed item reaches a prescribed size, a discharge hole provided below the forming chamber is opened and the compression slider is lowered to discharge the formed item.

Patent Document 3 discloses a solidifying apparatus that supplies powder particles collected by a dust collector to a forming chamber provided below a hopper, and solidifies the powder particles by a forming member and an opening and closing member. Patent Document 3 describes that the forming chamber is arranged horizontally and the solidified powder particles are moved outside the forming chamber by the forming member, and the solidified powder particles that adhere to the tip of the forming member are caused to fall by a cleaning member that descends from above.

CITATION LIST

Patent Literature

Patent Document 1: JP H04-123898 A
Patent Document 2: JP 2010-069536 A
Patent Document 3: JP 2011-156560 A

SUMMARY OF INVENTION

Technical Problem

In actuality, collected dust does not necessarily have a homogeneous constitution across the entirety thereof, and there are cases when there is localization of components that are easy to solidify and components that are difficult to solidify. For example, a component that is easy to solidify is a portion including a large amount of fumes and a component that is difficult to solidify is a portion where metal is precipitated in a size larger than the fumes and becomes particulate. Supplying dust with such localized variations as is, applying pressure, and trying to solidify leads to cases where solidification is not readily possible with portions including a large amount of metal particles in the dust.

In the solidification apparatuses described in Patent Documents 1-3 mentioned above, the dust that is the target of solidification is captured or collected and the collected dust is then supplied as is to mechanisms for performing the solidification processing of the apparatuses. Accordingly, in cases where there is localization of components that solidify and components that do not solidify easily, there is a risk with these solidification apparatuses that desired solidification is not possible.

The present invention is provided in view of the above circumstances and the problem to be solved by the present invention is to provide a dust solidification apparatus that, with a simple structure, homogenizes dust components and that can stably solidify the dust.

Solution to Problem

The present invention employs the means indicated below in order to solve the above-mentioned problem.

Specifically, a dust solidification apparatus of the present invention comprises: a storage tank that stores dust; a forming member provided within the storage tank, the forming member having a forming hole; and a pressurizing rod that is configured to freely advance and withdraw with respect to the inside of the forming hole, wherein the pressurizing rod is made to advance into the forming hole to solidify dust filled therein, thereby obtaining a solidified substance, the forming hole has an entry section and a discharge section for the pressurizing rod and is in communication with the inside of the storage tank, and a stirring passage is provided in the outside of the discharge section to guide dust pushed out from the discharge section by the advancement of the pressurizing rod into the entry section in a direction different from the discharge direction and to stir the dust.

With such a structure, because a stirring passage is provided to guide dust pushed out from the discharge section in a direction different from the discharge direction and to stir the dust, it is possible to uniformly stir the dust components by means of the back and forth movement of the pressurizing rod.

In one embodiment of the present disclosure, the stirring passage is formed from a return passage provided with a first guide wall that guides the dust discharged from the discharge section in a direction intersecting the discharge direction and a second guide wall that guides the dust guided in the intersecting direction in a direction that is opposite the discharge direction.

According to such a configuration, it is possible to adopt an efficient structure as the stirring passage.

In one embodiment of the present disclosure, in the storage tank, a shaft body is rotatably supported in the vicinity of the entry section of the forming hole, a stirring body that extends outwardly in the radial direction of the shaft body is fixed to the shaft body, and a protrusion that abuts the pressurizing rod, when said rod advances into the entry section, to rotate the shaft body and the stirring body is provided.

According to such a configuration, a stirring body that operates in tandem with the rod is provided, so it is possible to further stir the dust well by adopting a simple structure.

In one embodiment of the present disclosure, in the storage tank, a second shaft body that is rotatably supported and stirring blades that are fixed to the second shaft body are provided, and the dust solidification apparatus comprises a drive source that rotates the second shaft body and the stirring blades.

According to such a configuration, dust can be stirred with the stirring blades connected to the drive source, so it is possible to efficiently and reliably stir the dust.

In one embodiment of the present disclosure, the stirring passage is a pipe passage that passes the dust through a certain section and a certain cross-sectional area.

According to such a configuration, it is possible to adopt an appropriate structure for the stirring passage.

A dust solidification apparatus according to a different viewpoint of the present invention comprises: a storage tank that stores dust; a forming member provided within the storage tank, the forming member having a forming hole; and a pressurizing rod that is configured to freely advance and withdraw with respect to the inside of the forming hole, wherein the pressurizing rod is made to advance into the forming hole to solidify dust filled therein, thereby obtaining a solidified substance, the forming hole has an entry section and a discharge section for the pressurizing rod and is in communication with the inside of the storage tank, and in the storage tank, a shaft body is rotatably supported near the entry section of the forming hole, a stirring body that extends outwardly in the radial direction of the shaft body is fixed to the shaft body, and a protrusion that abuts the pressurizing rod, when the pressurizing rod advances into the entry section, to rotate the shaft body and the stirring body is provided.

According to such a configuration, a stirring body that operates in tandem with the rod is provided, so it is possible to efficiently stir the dust by adopting a simple structure.

A dust solidification apparatus according to another viewpoint of the present invention comprises: a storage tank that stores dust; a forming member provided within the storage tank, the forming member having a forming hole; and a pressurizing rod that is configured to freely advance and withdraw with respect to the inside of the forming hole, wherein the pressurizing rod is made to advance into the forming hole to solidify dust filled therein, thereby obtaining a solidified substance, and in the storage tank, a second shaft body that is rotatably supported and stirring blades that are fixed to the second shaft body are provided, and the dust solidification apparatus comprises a drive source that rotates the second shaft body and the stirring blades.

According to such a configuration, dust can be stirred with the stirring blades connected to the drive source, so it is possible to efficiently and reliably stir the dust.

Effects of Invention

According to the present invention, it is possible to provide a dust solidification apparatus that, with a simple structure, homogenizes dust components and that can stably solidify the dust.

DESCRIPTION OF EMBODIMENTS

First Embodiment

Figure 1:
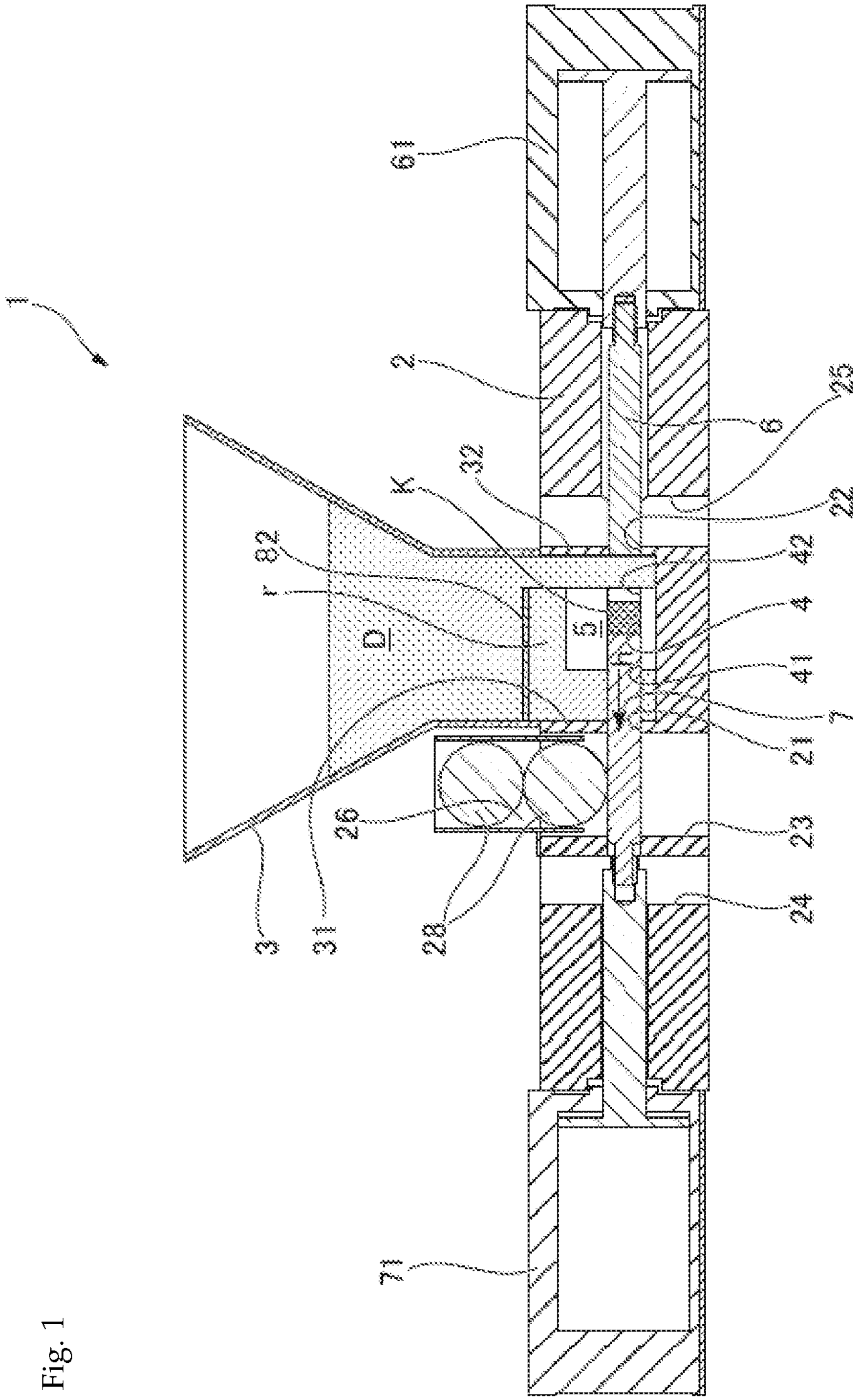
FIG. 1 is a side cross-sectional view of a dust solidification apparatus illustrated as an embodiment of the present invention.

Hereinafter, embodiments of the present invention will be described with reference to the drawings. FIG. 1 is a side cross-sectional view of a dust solidification apparatus of the present embodiment.

As illustrated in FIG. 1, the dust solidification apparatus 1 comprises an apparatus body 2; a storage tank 3 that stores dust D and that is provided on the apparatus body 2; a forming member 5 provided within the storage tank 3, the forming member 5 having a forming hole 4; a pressurizing rod 6 that is configured to freely advance and withdraw with respect to the inside of the forming hole 4; a closing rod 7 facing the pressurizing rod 6; a pressurizing rod driving cylinder 61 for driving the pressurizing rod 6; and a closing rod driving cylinder 71 for driving the closing rod 7. The dust solidification apparatus 1 is configured to advance the pressurizing rod 6 into the forming hole 4 to solidify the dust D filled therein, thereby obtaining a solidified substance K.

The forming hole 4 has an entry section 42 and a discharge section 41 for the pressurizing rod 6 and is in communication with the inside of the storage tank 3, and the closing rod 7 is configured to freely advance into and withdraw from the discharge section 41 of the forming hole 4 and the pressurizing rod 6 is configured to freely advance into and withdraw from the entry section 42 of the forming hole.

A first wall 31 and a second wall 32 of the apparatus body 2 are provided facing the discharge section 41 and the entry section 42 of the forming hole 4, respectively. In addition, in the first wall 31 and the second wall 32, a first hole 21 and a second hole 22, positioned on the axial line of the forming hole 4, in which one or both of the closing rod 7 and the pressurizing rod 6 move back and forth, are formed. The solidified substance K solidified in the forming hole 4 is conveyable to the outside of the storage tank 3 through the first hole 21 along with the closing rod 7 and the pressurizing rod 6. Additionally, the first wall 31 and the second wall 32 may also constitute side walls within the storage tank 3.

In the apparatus body 2, a discharge hole 23 that intersects with the first hole 21 and that extends in a vertical direction is formed near the outside of the storage tank 3. When the solidified substance K sandwiched between the closing rod 7 and the pressurizing rod 6 moves to the inside of the discharge hole 23, the solidified substance K is made to drop and be discharged from the discharge hole 23.

Additionally, in the apparatus body 2, dust-proof holes 24 and 25 that intersect with the first hole 21 and the second hole 22 and that extend in a vertical direction are formed near the storage tank 3 and the discharge hole 23.

Additionally, as indicated above, the discharge hole 23 intersects the first hole 21 and extends in the vertical direction. An upper portion of the first hole 21 functions as a weight applying member arrangement section 26. The lower portion of the first hole is formed to function as the discharge hole 23. Weight applying members 28 are arranged in the weight applying member arrangement section 26. The weight applying members 28 are freely rollable on the pressurizing rod 6 and the closing rod 7 when the pressurizing rod 6, the closing rod 7, and solidified substance K sandwiched therebetween move inside the first hole 21 and discharges the solidified substance K to the side of the discharge hole 23 when positioned on the solidified substance K. In the present embodiment, the weight applying members 28 are cylindrical members having a weight equal to or greater than a certain value, wherein two of them are stacked vertically in the weight applying member arrangement section 26.

Figure 2:
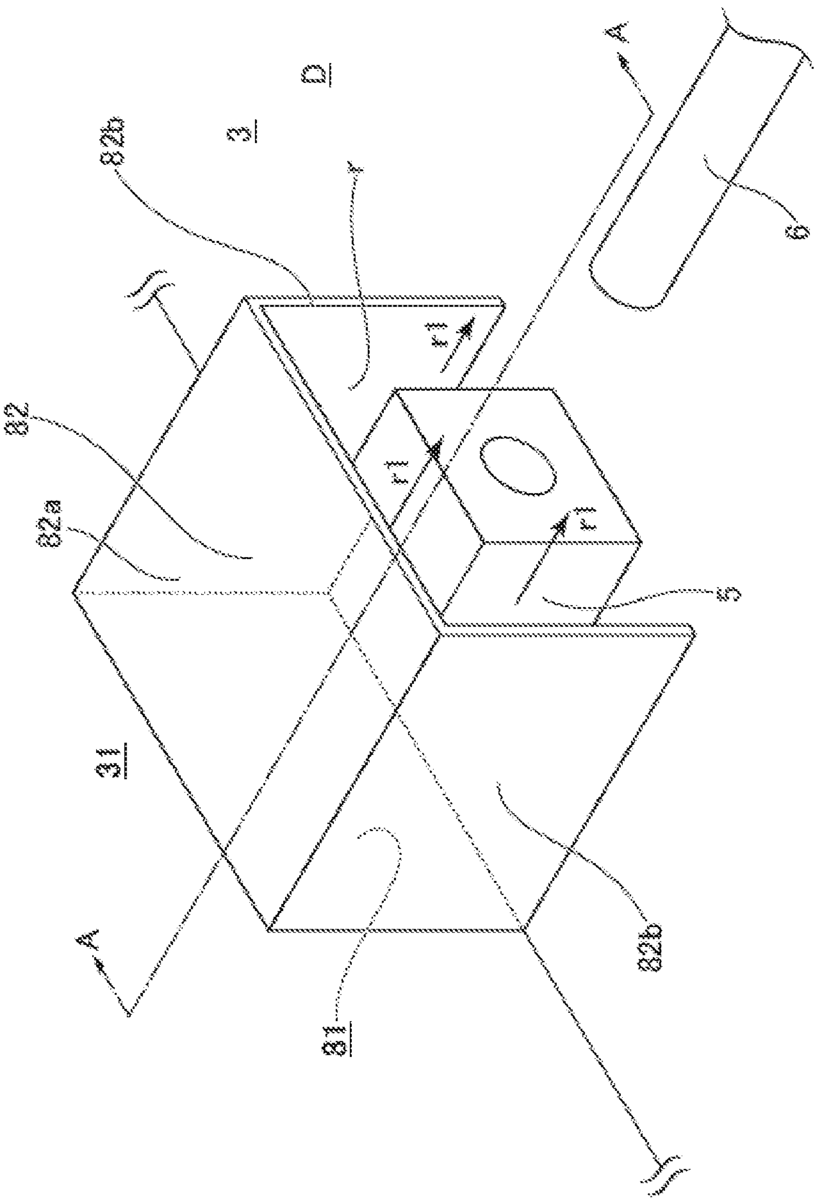
FIG. 2 is an enlarged perspective view of the main part in the storage tank of the dust solidification apparatus illustrated in FIG. 1.
Figure 3:
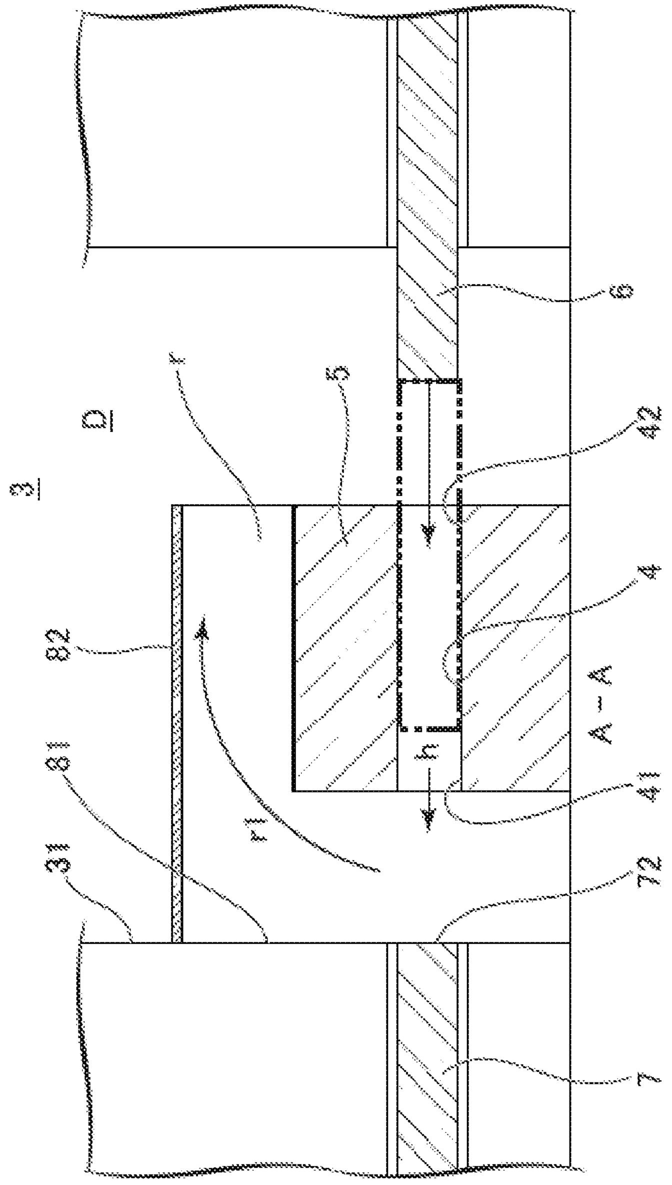
FIG. 3 is an A-A cross-sectional arrow view of FIG. 2.

On the outside of the discharge section 41, a stirring passage r is provided to guide the dust D pushed out from the discharge section 41 by the advancement of the pressurizing rod 6 into the entry section in a direction differing from the discharge direction h and to stir the dust. FIG. 2 is a perspective view of the main part in the storage tank 3 and FIG. 3 is an A-A cross-sectional arrow view of FIG. 2. In addition, while FIG. 2 and FIG. 3 illustrate the inside of the storage tank 3 filled with the dust D, in order to make the drawings easy to see, the grain pattern representing the dust D depicted in FIG. 1 is omitted. The same omission was also done below when illustrating the inside of the storage tank 3.

The stirring passage r in the embodiment as illustrated in FIGS. 2 and 3 is formed from return passages r1 provided with a first guide wall 81 that guides dust in a direction intersecting the discharge direction h illustrated in FIG. 3 and a second guide wall 82 that guides the dust guided in the intersecting direction in the opposite direction of the discharge direction h. The first guide wall 81 is composed of a side wall 31 of the storage tank 3 and a tip portion 72 of the closing rod 7 positioned substantially flush with the side wall 31. As illustrated in FIG. 2, the second guide wall 82 is formed to surround the forming member 5 in a U shape with a top plate 82*a* positioned above the forming member 5 and side plates 82*b* and 82*b* positioned on the left and right of the forming member 5. The second guide wall 82 is positioned without a gap with the first guide wall 81 and is fixed inside the storage tank 3. The return passages r1 formed with such a configuration is opened toward the inside of the storage tank 3.

Next, the operations of the thus configured dust solidification apparatus 1 are explained. As there are cases when the composition of the dust D may be localized in the storage tank 3 in a portion containing a large amount of a component that is easily solidified and a portion containing a large amount of a component that is difficult to solidify, the dust solidification apparatus 1 in the present embodiment performs a step of stirring the dust D before performing a solidification step.

In the step for stirring the dust D, as indicated above, the tip portion 72 of the closing rod 7 is fixed at a position that is substantially flush with the side wall 31 and the pressurizing rod 6 is moved back and forth from the outer side of the forming hole 4 through the entry section 42 and to the discharge section 41 as indicated by the dashed line. Along with the back and forth movement of the pressurizing rod 6, the dust D is pushed into the forming hole 4, moves in the forming hole 4 in the discharge direction h, and pushed out from the discharge section 41. As the dust D is a powder having flowability, the dust D pushed out from the discharge section 41 moves to the upper side along the first guide wall 81 as seen in FIG. 3. The dust D that has moved to the upper side further moves along the second guide wall 82, and as a result, a return passage r1 is formed, as indicated with the reference number r1. Then, the dust is carried to the vicinity outside of the entry section 42 and is mixed and stirred with dust D filling the storage tank 3 above the pressurizing rod 6.

The abovementioned return passage r1, as explained concerning the top plate 82*a* in FIG. 2, engenders a similar action as with the side plates 82*b* and 82*b*, and as illustrated in FIG. 2, return passages r1 and r1 are also formed with respect to the side plates 82*b* and 82*b*.

After the abovementioned stirring step is performed sufficiently and the dust D is homogenized, the solidification step is performed. As illustrated in FIG. 1, in the solidification step, the closing rod 7 is statically fixed in the forming hole 4 and the pressurizing rod 6 is moved back and forth in the same manner as in the stirring step indicated above. By moving back and forth a number of times, the dust D is pushed into the forming hole 4 and pressure is applied. The dust D to which the pressure has been applied is formed into solidified substance K. After forming the solidified substance K to a desired size, the solidified substance K is sandwiched between the pressurizing rod 6 and the closing rod 7, is conveyed, along with the pressurizing rod 6 and the closing rod 7, through the first hole 21 to the discharge hole 23 on the outside of the storage tank 3 and dropped and discharged in the discharge hole 23. By appropriately repeating the abovementioned stirring step and the solidification step, the dust D in the storage tank 3 is continuously processed for solidification.

As indicated above, the dust solidification apparatus 1 in the present embodiment adopts the stirring step before the solidification step, so even if the constitution of the dust D is uneven and localized with portions that solidify easily and portions that do not solidify easily, the constitution of the dust D is homogenized and solidification processing is possible. Accordingly, the solidification processing can be achieved stably. The dust solidification apparatus 1 in the present embodiment provides the conventional structure with the simple structure of the second guide wall 82, making it possible to achieve a stirring mechanism that homogenizes the dust D constitution without greatly modifying the conventional structure. In addition, in the stirring step, by only appropriately controlling the static position of the closing rod 7 and the back and forth movement of the pressurizing rod 6, it is possible to achieve a stirring step with control that is substantially the same as that of the pressurizing step. Accordingly, with a simple structure and control, the dust constitution is homogenized and it is possible to stably solidify the dust.

Second Embodiment

Figure 4:
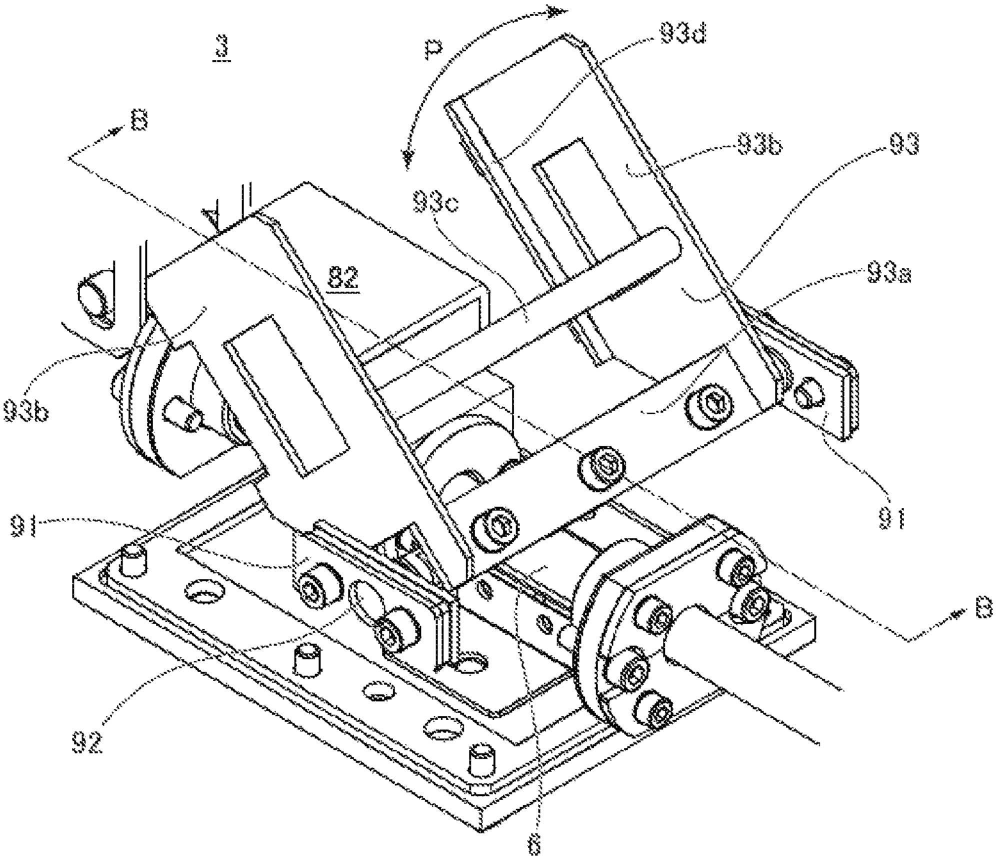
FIG. 4 is an enlarged perspective view of the main part in the storage tank of the dust solidification apparatus illustrated as an embodiment of the present invention.
Figure 5:
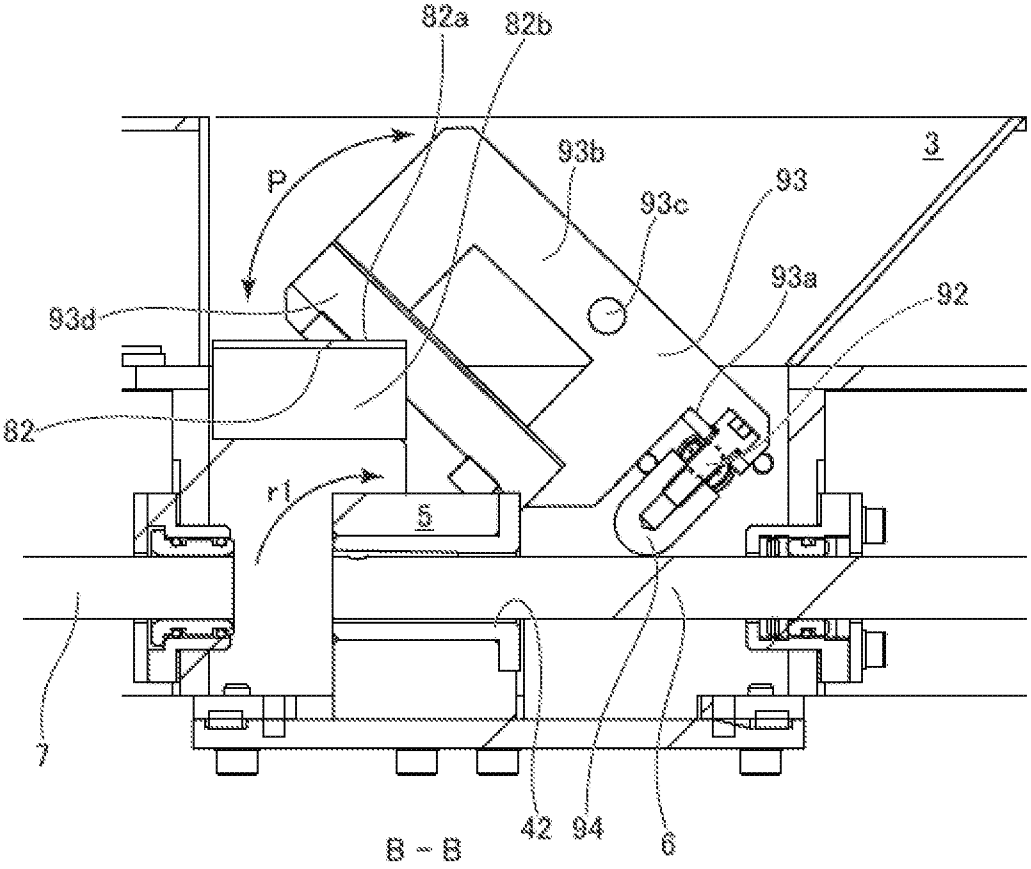
FIG. 5 is a B-B cross-sectional arrow view of FIG. 4.
Figure 6:
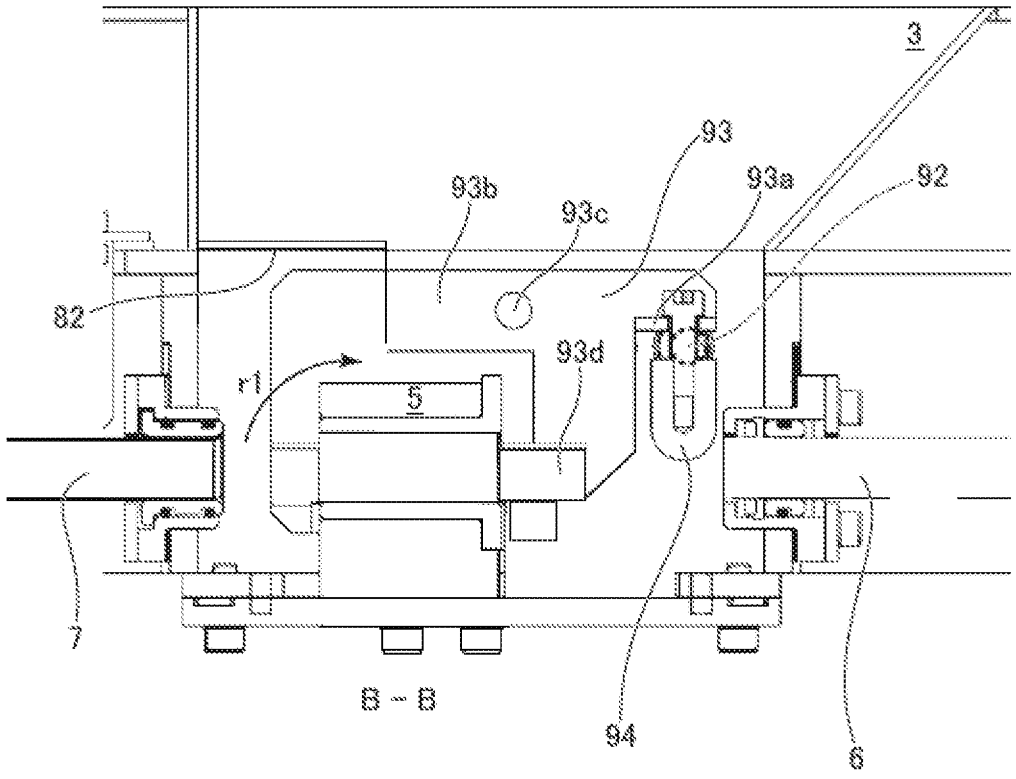
FIG. 6 is a B-B cross-sectional arrow view of FIG. 4.

FIG. 4 is an enlarged perspective view of the main part in the storage tank 3 in the present embodiment. FIG. 5 and FIG. 6 are a B-B cross-sectional arrow view of FIG. 4. What is different between the present embodiment and the first embodiment is that, in addition to the structural elements in the first embodiment, as illustrated in FIG. 5, in the storage tank 3, a shaft body 92 is rotatably supported near the entry section 42, stirring bodies 93 extend outwardly in the radial direction of the shaft body 92 and are fixed to the shaft body 92, and a protrusion 94 that abuts the pressurizing rod 6, when the pressurizing rod 6 advances into the entry section 42, to rotate the shaft body 92 and the stirring bodies 93 is provided.

As illustrated in FIG. 4, the shaft body 92 is rotatably supported by shaft support plates 91 and 91 fixed by a bolt to the side wall in the storage tank 3. The stirring bodies 93 are provided with a fixing frame 93*a*, side frames 93*b* and 93*b*, and a support rod 93*c*. The stirring bodies 93 are fixed to the shaft body 92 with bolts via the fixing frame 93*a*. The side frames 93*b* and 93*b* are fixed to both ends of the fixing frame 93*a* and the support rod 93*c* that provides auxiliary support for the side frames 93*b* and 93*b* is fixed between the side frames 93*b* and 93*b*.

Stirring plates 93*d* are provided in the bottom portion of the side frames 93*b* to stir dust D. The stirring plates 93*d* are provided so as to extend in the direction of the pressurizing rod 6 at a constant angle from the bottom portions of the side frames 93*b* in order to be capable of scooping up dust D.

Next, with reference to FIG. 5 and FIG. 6, the stirring step of the apparatus in the present embodiment configured to include the stirring bodies 93 is explained. The operations aside from the stirring step are the same as in the first embodiment, so the explanations thereof are omitted. In addition, the formation action of the return passages r1 in the present embodiment is the same as in the first embodiment, so the explanation thereof is omitted.

As illustrated in FIG. 6, when the pressurizing rod 6 is not positioned in the storage tank 3 and does not abut the protrusion 94, the stirring bodies 93 are biased by a biasing means that is not illustrated such that the stirring plates 93*d* are positioned at the bottom of the storage tank 3. As the biasing means in the present embodiment, a torsion spring (not illustrated) that biases the shaft body 92 is used.

As illustrated in FIG. 5, when the pressurizing rod 6 moves toward the forming member 5, the pressurizing rod 6 and the protrusion 94 abut. In tandem with this abutment, the stirring bodies 93 rotate about the shaft body 92. Accordingly, as illustrated in FIG. 5 and FIG. 6, the stirring bodies 93 pivot as indicated with arrow P in the drawings due to the back and forth movement of the pressurizing rod 6. With the pivoting of the stirring bodies 93, the stirring plates 93*d* scoop up dust D on both sides of the forming member 5 and in the vertical direction in the drawings and, when in the position illustrated in FIG. 5, the dust D is moved to the vicinity of the entry section 42 along the slants of the stirring plates 93*d*. The dust D is mixed and stirred with the dust D in the vicinity of the upper part of the pressurizing rod 6 in accordance with the above movement.

Accordingly, in addition to the stirring of the dust D by the return passages r1, which are the actions and effects obtained in the first embodiment, with the pivoting of the stirring bodies 93, the dust D can be further stirred and this makes it possible to improve stirring efficiency. The operations of the stirring bodies 93 are in tandem with the back and forth movement of the pressurizing rod 6, so it is possible to improve the stirring efficiency by adopting a simple structure without providing a new drive source and without adding any great changes to the conventional structure.

In the present embodiment, in order to form the return passages r1, only the top plate 82*a* is employed as the second guide wall 82, but as with the first embodiment, it is possible to employ the side plates 82*b*.

In the present embodiment, a torsion spring is employed as the biasing means, but the biasing means is not limited to this, and any biasing means that biases the stirring bodies 93 to the position illustrated in FIG. 6 can be employed. For example, in place of the torsion spring, it is possible to provide a tension spring between the tip portion of either side frame 93*b* or 93*b* and the bottom section in the storage tank 3.

In the present embodiment, the stirring plates 93*d* are provided at the bottom portions of the side frames 93*b* to scoop up dust D, but they are not limited to this, and it is possible to provide a plurality of stirring plates 93*d* that extend to the pressurizing rod 6 side from any position of the side frames 93*b*. The shape of the stirring plates 93*d*, the positions where they are provided, as well as the number thereof can be appropriately selected by considering stirring efficiency.

Modified Example of Second Embodiment

Figure 12:
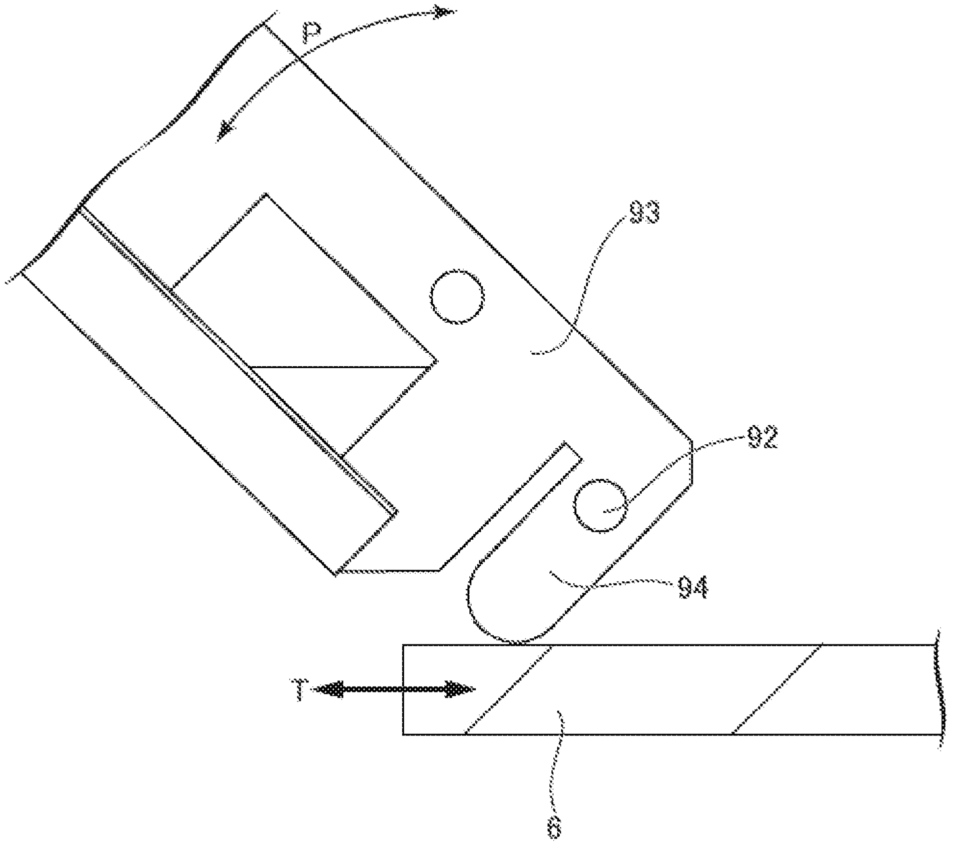
FIG. 12 is a schematic enlarged view of the main part in FIG. 5.
Figure 13:
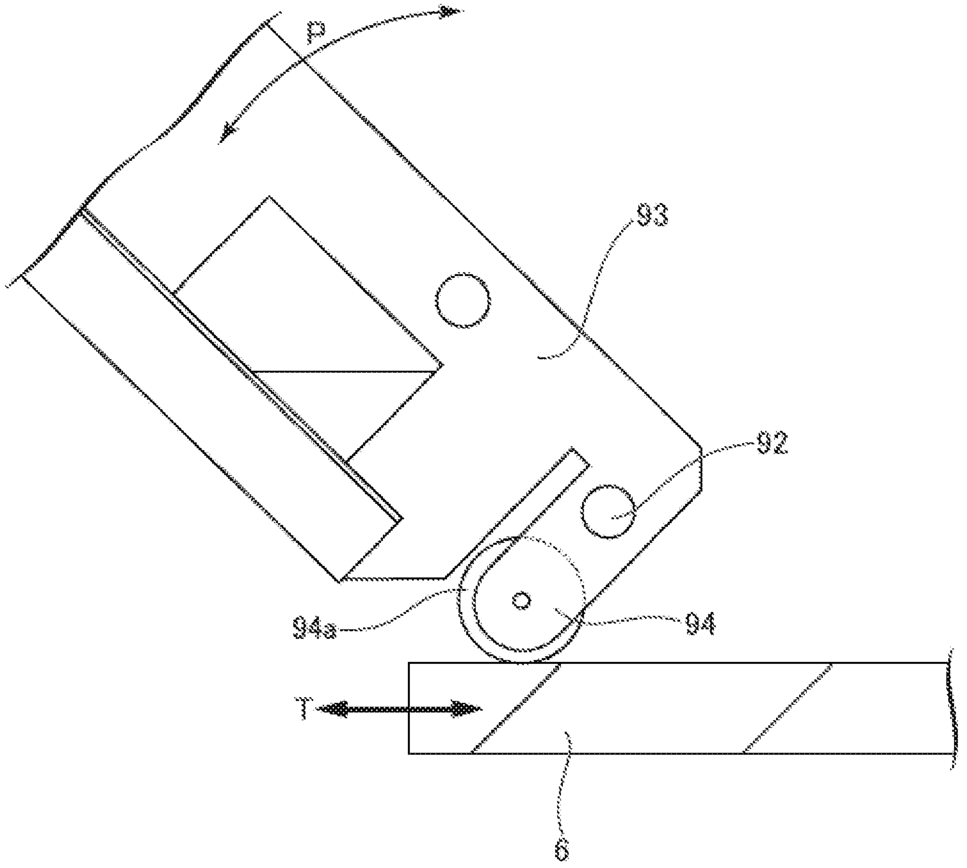
FIG. 13 is a schematic enlarged view of the main part according to a modified example of the second embodiment.

Next, a modified example of the second embodiment is explained with reference to FIG. 12 and FIG. 13. FIG. 12 is a schematic enlarged view of the main part including the pressurizing rod 6 and the protrusion 94 of the second embodiment. FIG. 13 is a schematic view of the modified example for the same portion. As illustrated in FIG. 12, in the second embodiment, the stirring bodies 93 pivot like the arrow P because the tip of the protrusion 94 abuts and slides on the pressurizing rod 6 due to the back and forth movement T of the pressurizing rod 6. The dust D is stirred due to the pivoting of the stirring bodies 93. In the modified example, a roller 94*a* is provided on the tip of the protrusion 94 as illustrated in FIG. 13. In this way, by providing a roller 94*a* on the tip of the protrusion 94, the resistance concerning the operations of the pressurizing rod 6 and the protrusion 94 can be reduced, and in addition to the actions and effects in the second embodiment, it is possible to achieve a smoother stirring operation.

Third Embodiment

Figure 7:
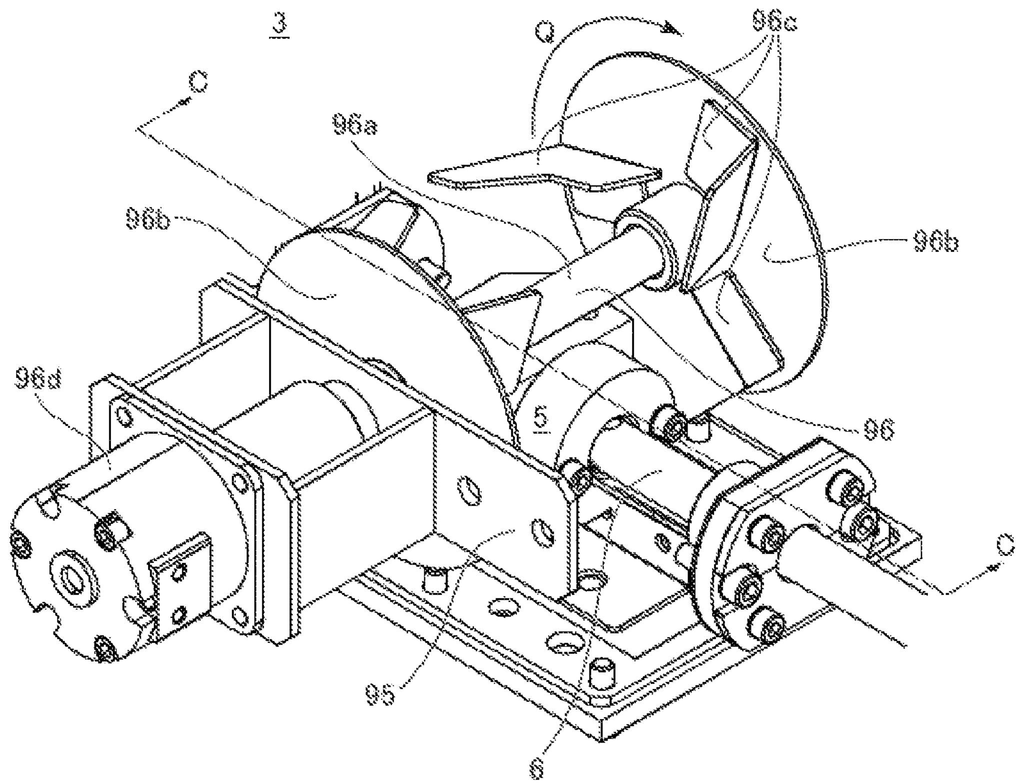
FIG. 7 is an enlarged perspective view of the main part in the storage tank of the dust solidification apparatus illustrated as an embodiment of the present invention.
Figure 8:
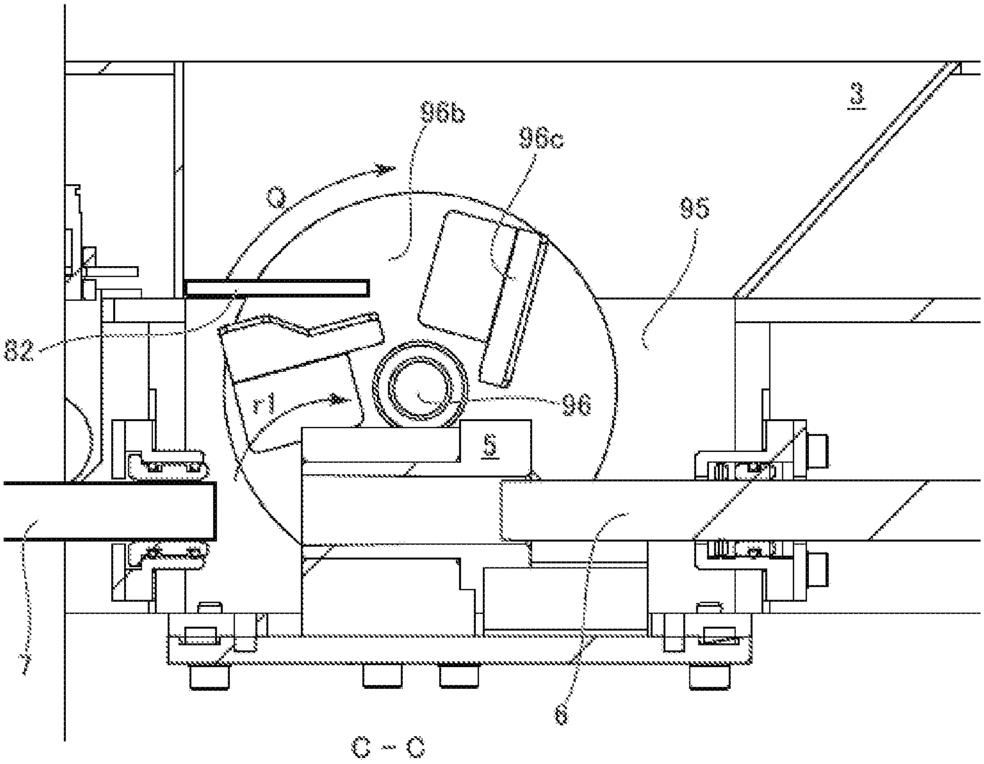
FIG. 8 is a C-C cross-sectional arrow view of FIG. 7.

FIG. 7 is an enlarged perspective view of the main part in the storage tank 3 in the present embodiment. FIG. 8 is a C-C cross-sectional arrow view of FIG. 7. What is different in the present embodiment from the first embodiment is that, in addition to the structural elements in the first embodiment, in the storage tank 3, a second shaft body 96 that is rotatably supported and stirring blades 96*c* fixed to the second shaft body 96 are provided, and a drive source 96*d* that rotates the second shaft body 96 and the stirring blades 96*c* is provided, as illustrated in FIG. 7.

More specifically, as illustrated in FIG. 7, the second shaft body 96 is rotatably supported by a support frame 95 that is fixed to the sidewall of the storage tank 3. A pair of rotating circular disks 96*b* and 96*b* is fixed to the rod 96*a*, forming a portion of the second shaft body 96, at positions on either side that are separated from the center of the rod 96*a* at a constant dimension. Three of the stirring blades 96*c* are each fixed to the inner surfaces of the rotating circular disks 96*b* and 96*b* that face each other. A rotary actuator is fixed to the support frame 95 as the drive source 96*d* for rotationally driving the second shaft body 96.

Next, with reference to FIG. 7 and FIG. 8, the stirring step of the apparatus in the present embodiment configured to include the stirring blades 96*c* is explained. The operations aside from the stirring step in the present embodiment are the same as in the first embodiment, so the explanations thereof are omitted. In addition, the formation action of the return passages r1 in the present embodiment is the same as in the first embodiment, so the explanation thereof is omitted.

In the present embodiment, during the stirring step, the stirring blades 96*s* are rotated in the orientation of arrow Q illustrated in FIG. 7 by means of the rotary actuator 96*d*. The dust D is stirred by rotating the stirring blades 96*c*. That is, in addition to the effects of the return passages r1 having the same actions as in the first embodiment illustrated in FIG. 8, the dust D is stirred by the stirring blades 96*c*.

Accordingly, in the present embodiment, in addition to the same actions and effects as those in the first embodiment, the stirring effects of the stirring blades 96*c* are added, making it possible to achieve efficient stirring of the dust D. The rotation driving of the stirring blades 96*c* by means of the rotary actuator 96*d* is independent of the operations of the pressurizing rod 6 and the closing rod 7. Through this, it is possible to continuously carry out the stirring operations at the same time as the solidification process of the pressurizing rod 6 and the closing rod 7, making it possible to efficiently homogenize the constitution of the dust D.

In the present embodiment, the orientation of arrow Q is adopted as the rotation direction of the stirring blades 96*c*, but is not limited to this, and it is possible to rotate the stirring blades 96*c* in the opposite direction of the arrow Q. It is also possible to add the rotation of the arrow Q and the opposite rotation thereof to each other. Rotation control of the stirring blades 96*c* can be appropriately selected while considering the stirring situation.

Fourth Embodiment

Figure 9:
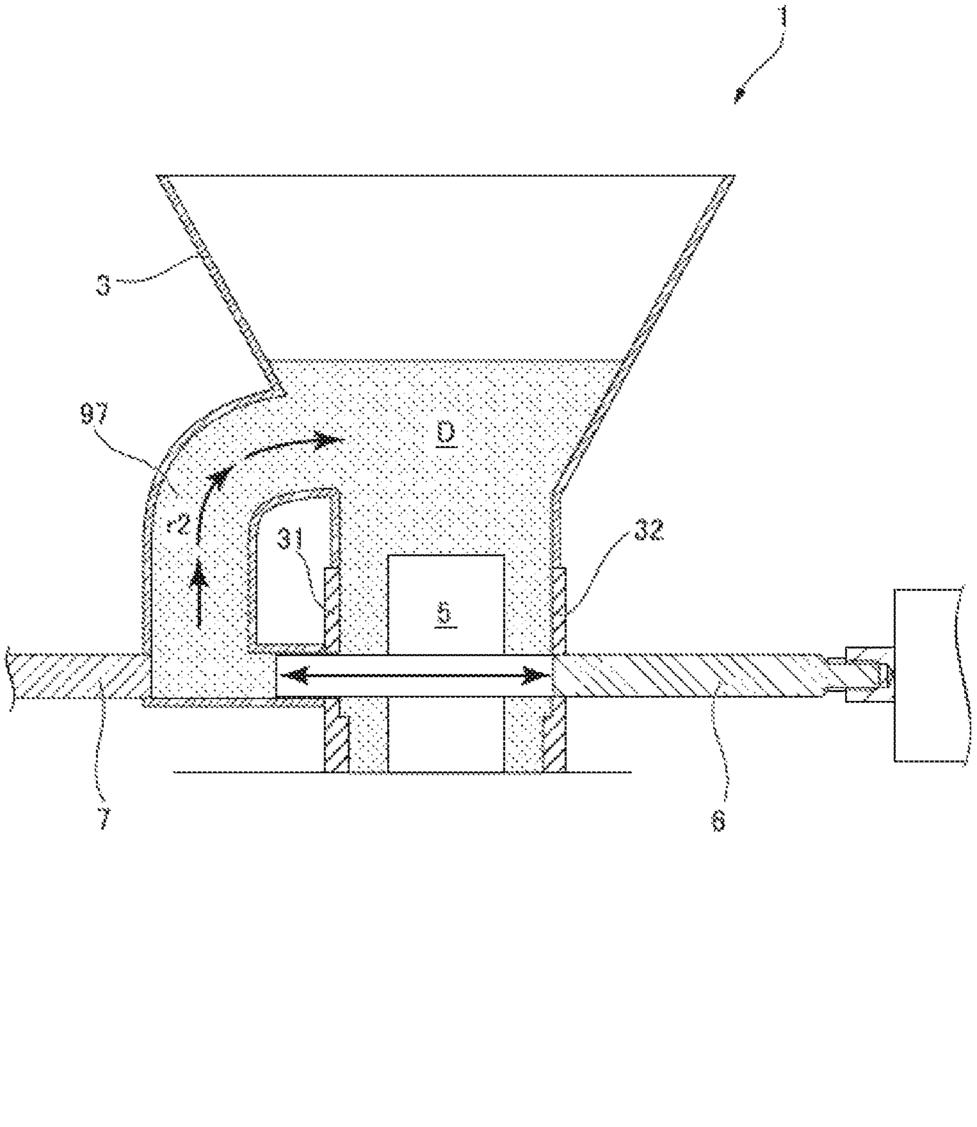
FIG. 9 is a side cross-sectional view of the storage tank of the dust solidification apparatus illustrated as an embodiment of the present invention.

FIG. 9 is a side cross-sectional view of the storage tank 3 of the dust solidification apparatus 1 in the present embodiment. What is different in the present embodiment from the first embodiment is that a pipe passage 97 that passes the dust D through a certain section and a certain cross-sectional area is adopted as the stirring path r2. The pipe passage 97 is formed from the bottom of the storage tank 3 to be in communication with the top portion of the storage tank through the exterior of the sidewall 31.

As illustrated in FIG. 9, in the stirring step in the present embodiment, the closing rod 7 is statically fixed to the lower part of the pipe passage 97 so as to be substantially flush with the inner surface of the pipe passage 97. In this state, the pressurizing rod 6 is moved back and forth as indicated with the arrow and the stirring path r2 circulates the dust as indicated with the arrow, making it possible to stir the dust D. Accordingly, the same actions as those in the first embodiment are provided, making it possible to obtain the same effects.

Fifth Embodiment

Figure 10:
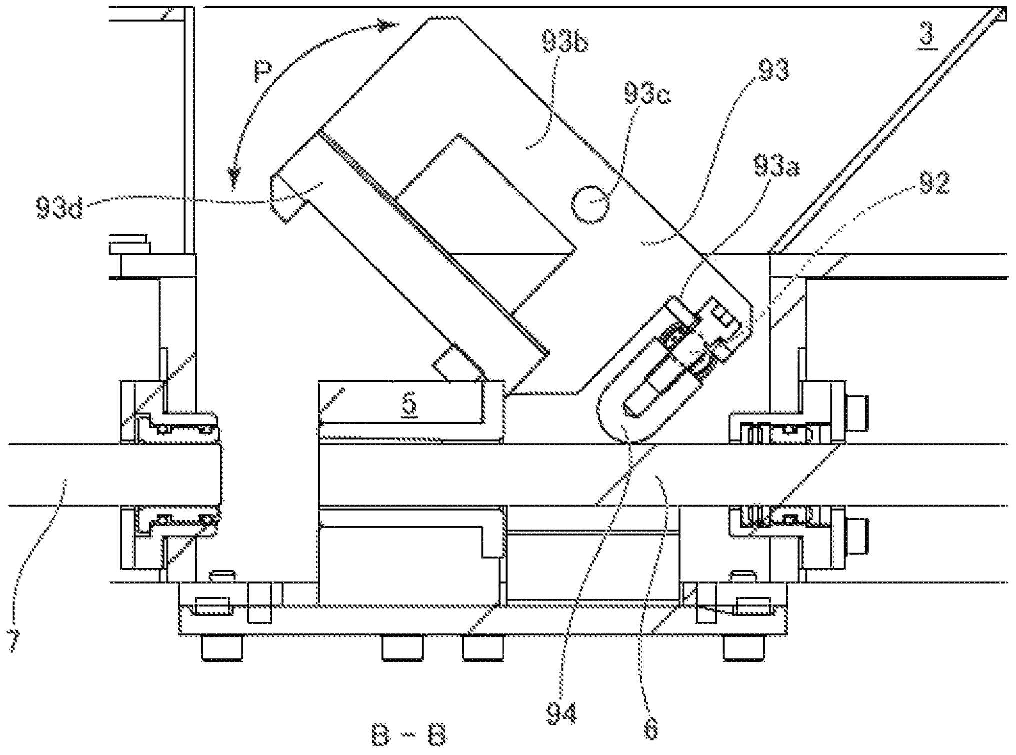
FIG. 10 is a side cross-sectional view of a main part in the storage tank of the dust solidification apparatus illustrated as an embodiment of the present invention.

FIG. 10 is a side cross-sectional view of the main part inside the storage tank of the dust solidification apparatus in the present embodiment. What is different in the present embodiment from the second embodiment is that the return passages r1 are not formed. The actions and effects of the structural elements including the additional stirring bodies 93 are the same as those of the second embodiment. In the present embodiment, the apparatus structure can be simplified.

Sixth Embodiment

Figure 11:
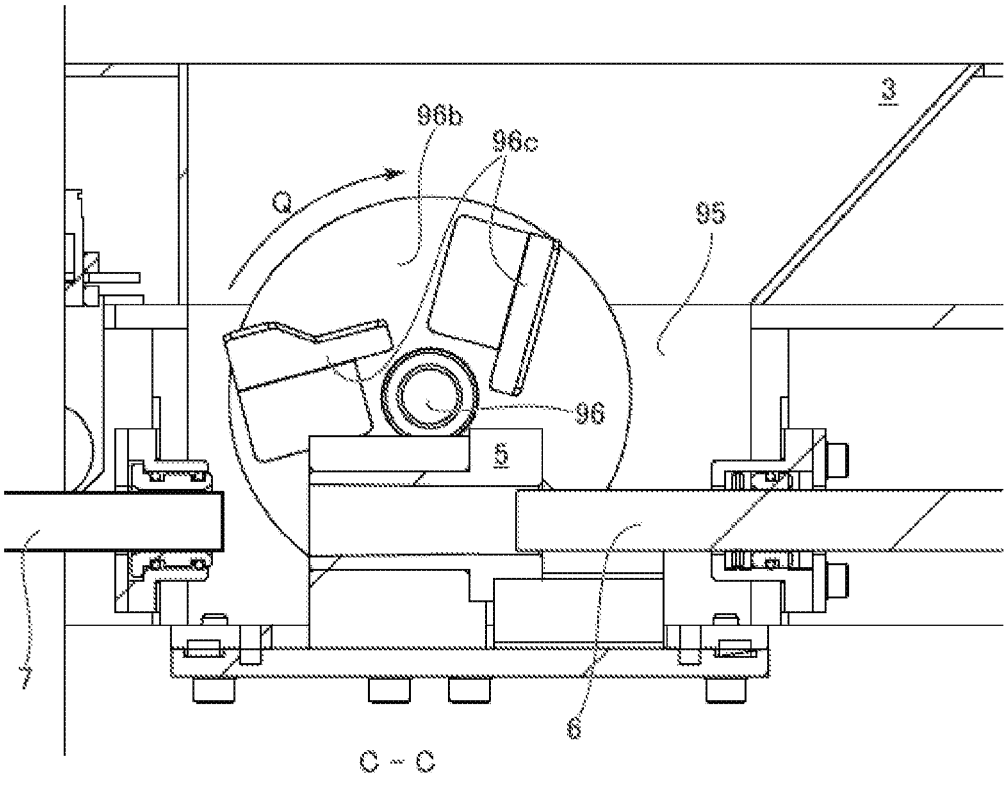
FIG. 11 is a side cross-sectional view of a main part in the storage tank of the dust solidification apparatus illustrated as an embodiment of the present invention.

FIG. 11 is a side cross-sectional view of the main part inside the storage tank of the dust solidification apparatus in the present embodiment. What is different in the present embodiment from the third embodiment is that the return passages r1 are not formed. The actions and effects of the structural elements including the additional stirring blades 96*c* are the same as those of the third embodiment. In the present embodiment, the apparatus structure can be simplified.

In the abovementioned embodiments, the dust D is defined as filling the storage tank 3, but regardless of the amount of the dust D, that is, even if the dust D in the storage tank 3 is not so large as to fill the storage tank, the actions and effects of the present invention can be effectively exerted.

REFERENCE SIGNS LIST

1 Dust solidification apparatus
3 Storage tank
4 Forming hole
41 Discharge section
42 Entry section
5 Forming member
6 Pressurizing rod
81 First guide wall
82 Second guide wall
92 Shaft body
93 Stirring body
94 Protrusion
96 Second shaft body
96*c* Stirring blades
96*d* Drive source (rotary actuator)
97 Pipe passage
D Dust
K Solidified substance
r Stirring passage
r1 Return passage

The invention claimed is:

1. A dust solidification apparatus comprising:
a storage tank that stores dust;
a forming member within the storage tank, the forming member having a forming hole; and
a pressurizing rod that is configured to freely advance and withdraw with respect to the inside of the forming hole, wherein
the pressurizing rod is made to advance into the forming hole to solidify dust filled therein, thereby obtaining a solidified substance,
the forming hole has an entry section and a discharge section for the pressurizing rod and is in communication with the storage tank, and
a stirring passage that is in communication between the discharge section and the storage tank in the outside of the discharge section, the stirring passage being configured to guide dust that is discharged from the discharge section by the entry of the pressurizing rod into the entry section, the dust that is discharged being guided in a direction different from the discharge direction of the dust that is discharged, the stirring passage being configured to stir the dust that is discharged, wherein the stirring passage comprises a return passage that includes a first guide wall that is configured to guide the dust that is discharged in a direction intersecting the discharge direction, and a second guide wall that surrounds the forming member and is configured to guide the dust that is guided in the intersecting direction in a direction opposite the discharge direction.

2. The dust solidification apparatus according to claim 1, further comprising a shaft body in the storage tank rotatably supported in the vicinity of the entry section of the forming hole, a stirring body in the storage tank that extends outwardly in the radial direction of the shaft body and that is fixed to the shaft body, and a protrusion in the storage tank that abuts the pressurizing rod, when the pressurizing rod advances into the entry section, to rotate the shaft body and the stirring body.

3. The dust solidification apparatus according to claim 1, further comprising:

a second shaft body in the storage tank that is rotatably supported, and stirring blades in the storage tank that are fixed to the second shaft body, and a drive source that rotates the second shaft body and the stirring blades.

4. The dust solidification apparatus according to claim 1, further comprising a second shaft body in the storage tank is rotatably supported, stirring blades that are fixed to the second shaft body, and a drive source that rotates the second shaft body and the stirring blades.

5. The dust solidification apparatus according to claim 1, wherein the stirring passage is a pipe passage that passes the dust through a certain section and a certain cross-sectional area.

6. The dust solidification apparatus according to claim 1, further comprising:

a shaft body in the storage tank rotatably supported in the vicinity of the entry section of the forming hole, a stirring body in the storage tank that extends outwardly in the radial direction of the shaft body and that is fixed to the shaft body, and a protrusion in the storage tank that abuts the pressurizing rod to rotate the shaft body and the stirring body.

* * * * *